Oct. 27, 1970  R. B. PELLEY ET AL  3,536,559
APPARATUS FOR MAKING HIGHLY CONTRACTILE
WIRE-REINFORCED FLEXIBLE HOSE
Filed July 6, 1967  7 Sheets-Sheet 1
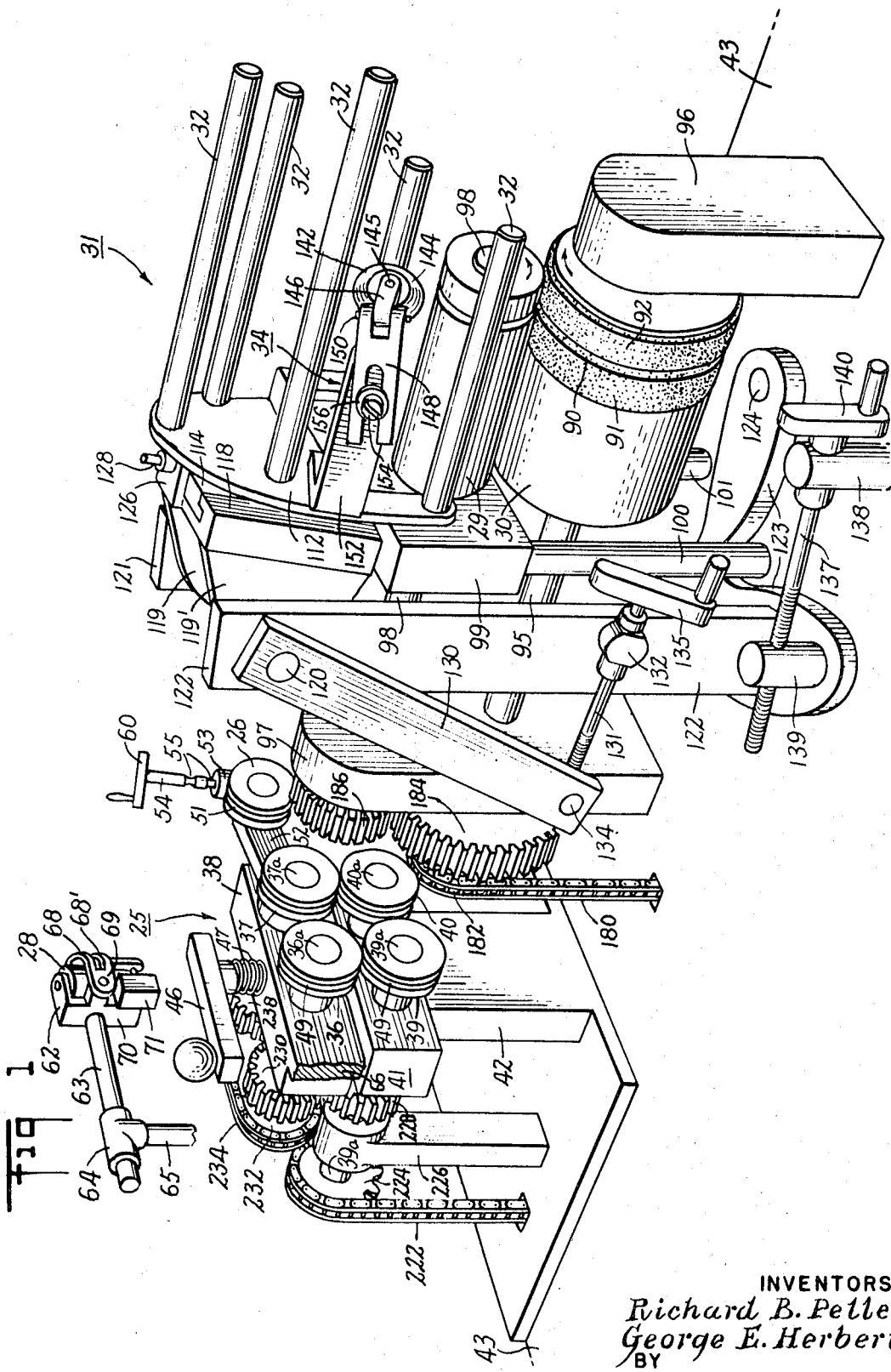
INVENTORS
Richard B. Pelley
George E. Herbert
BY
Blair Buckles Cesari & St. Onge
ATTORNEYS

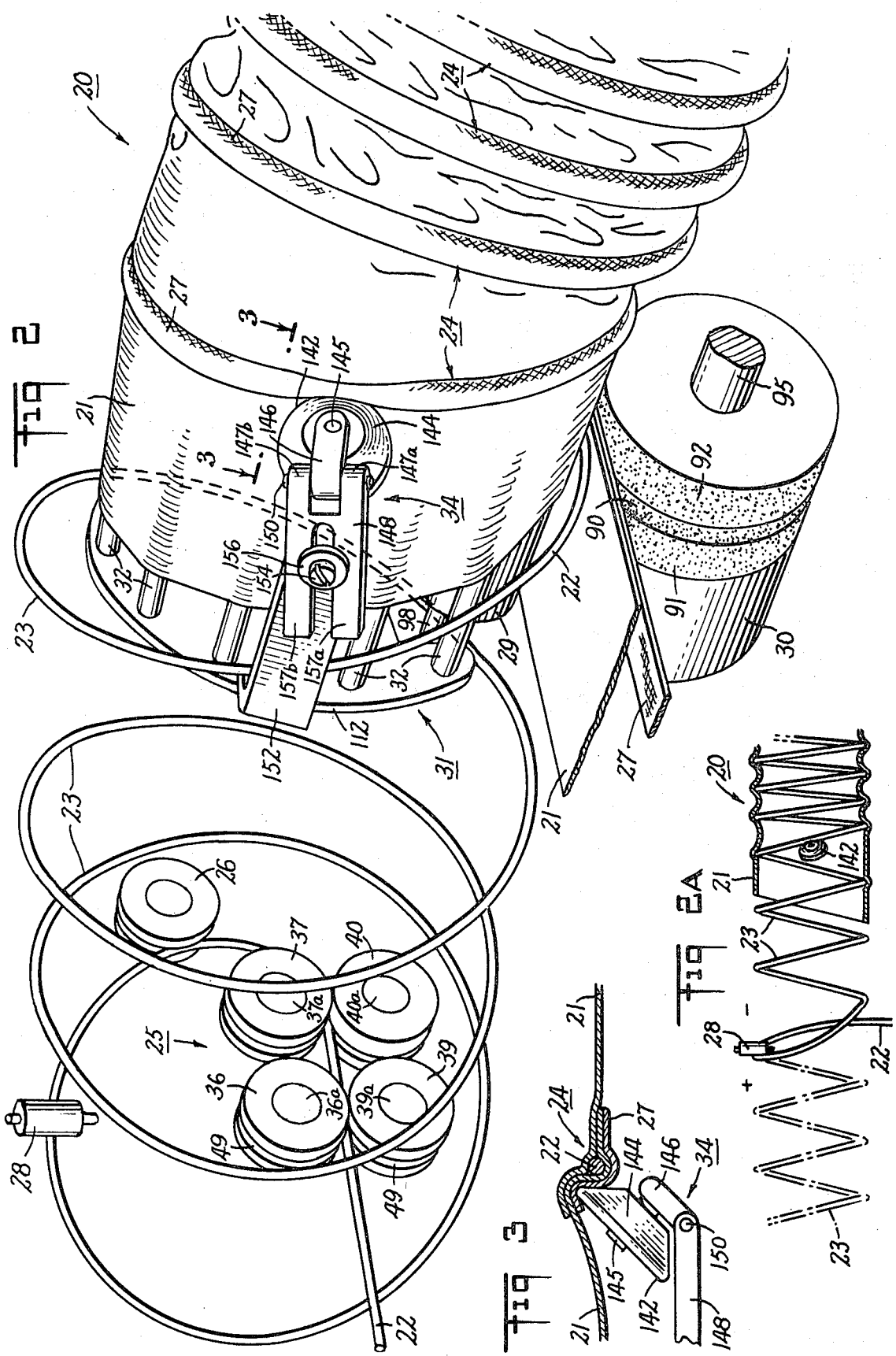

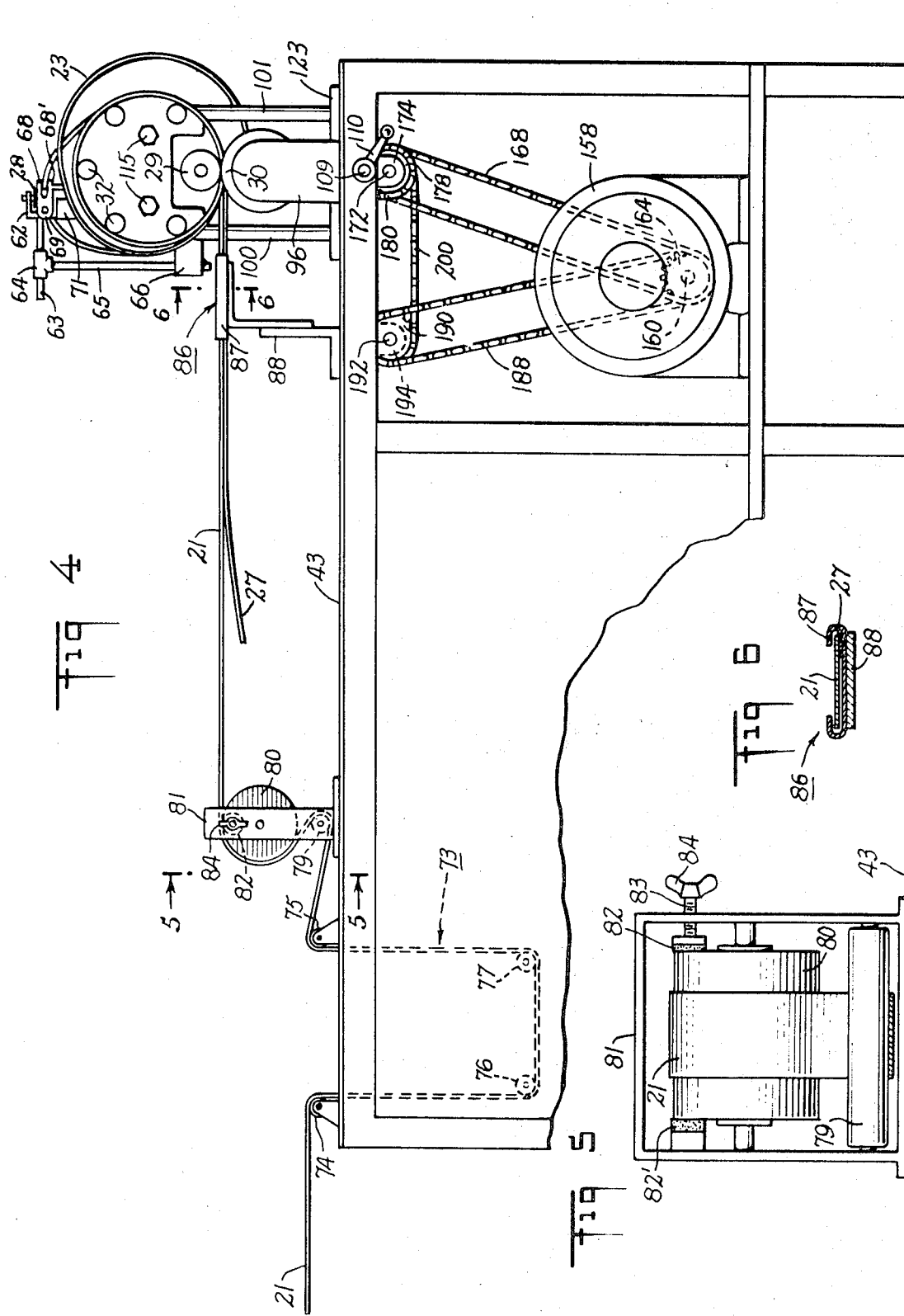

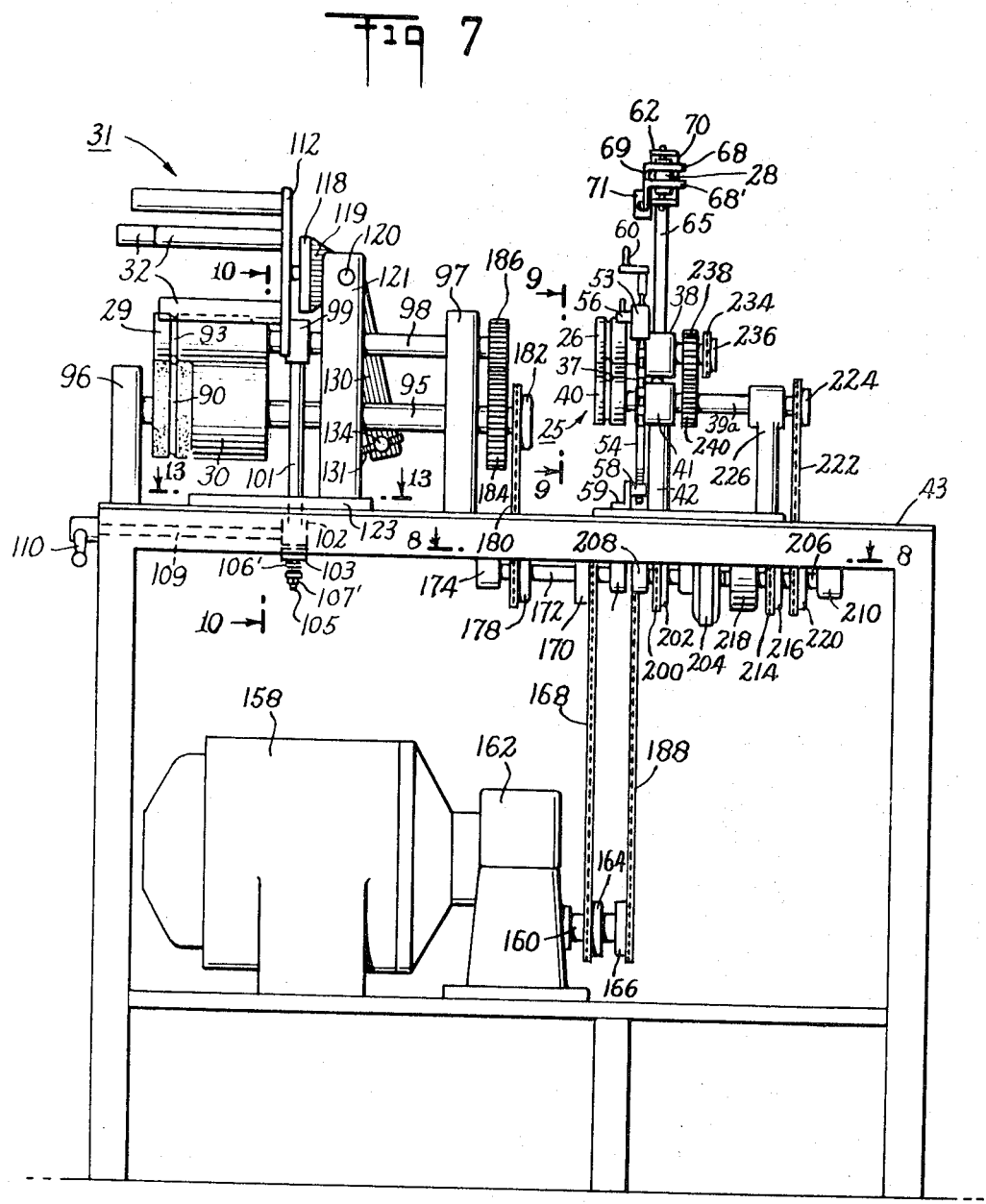

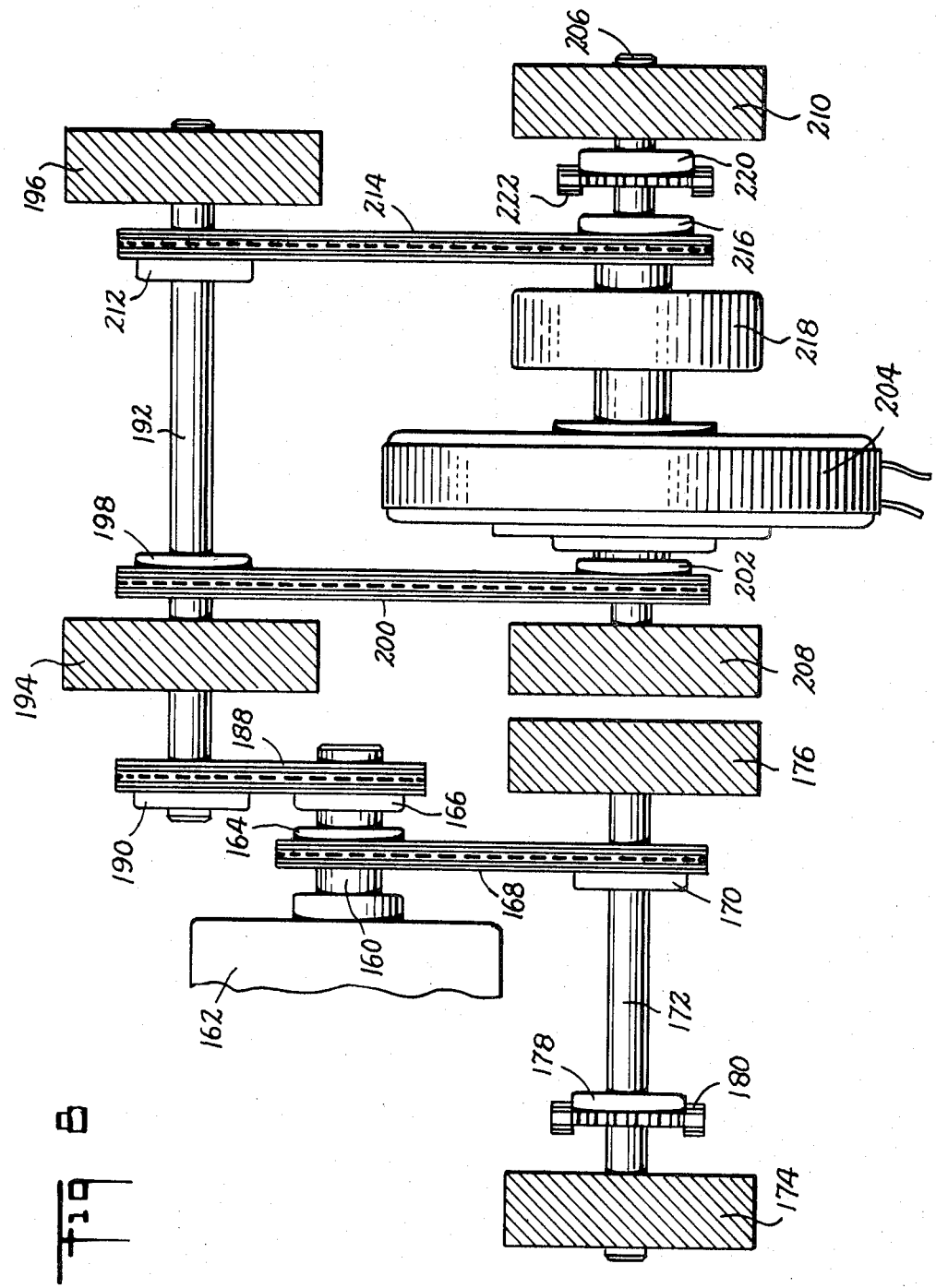

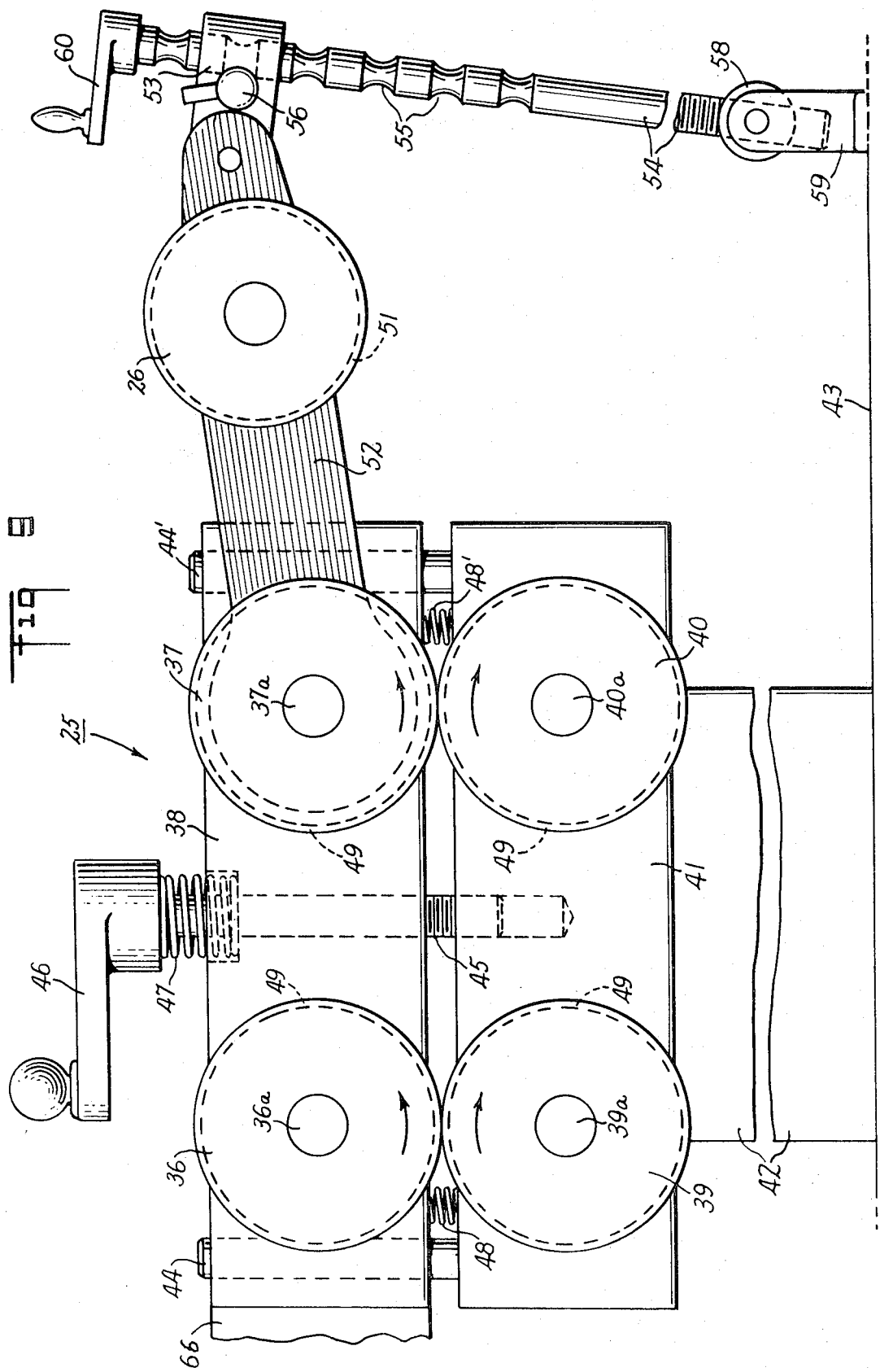

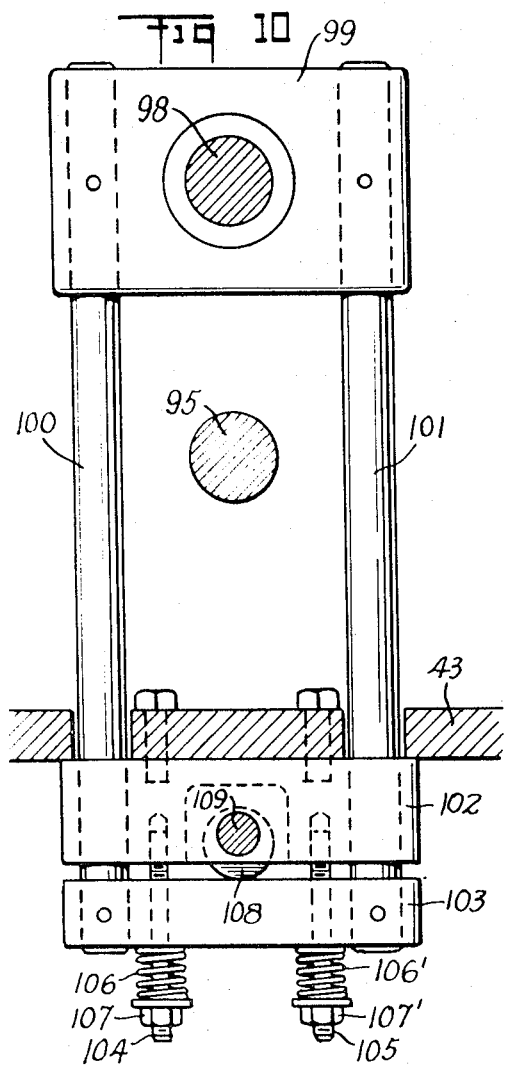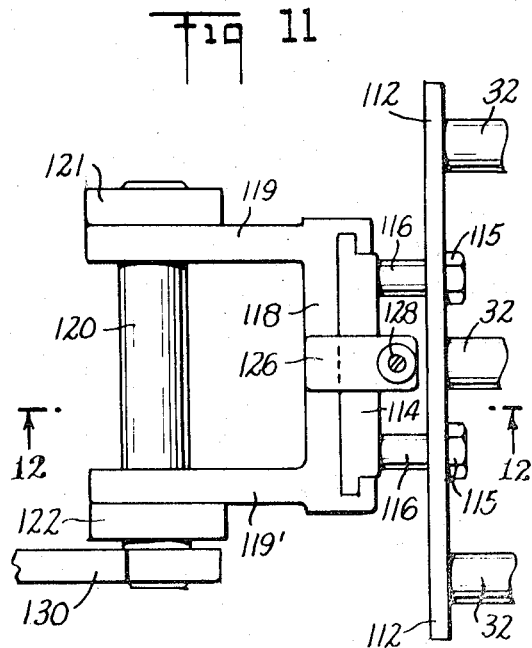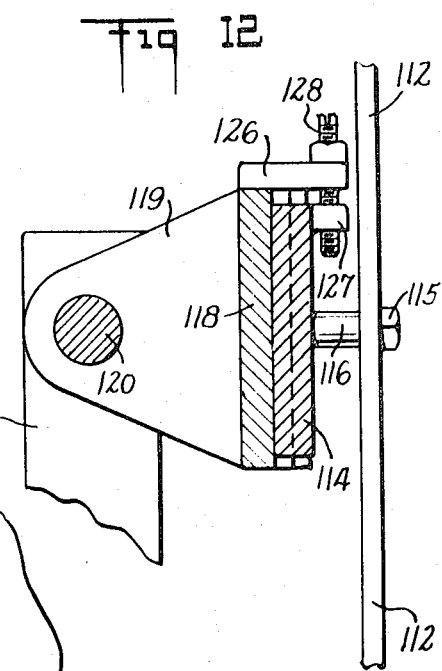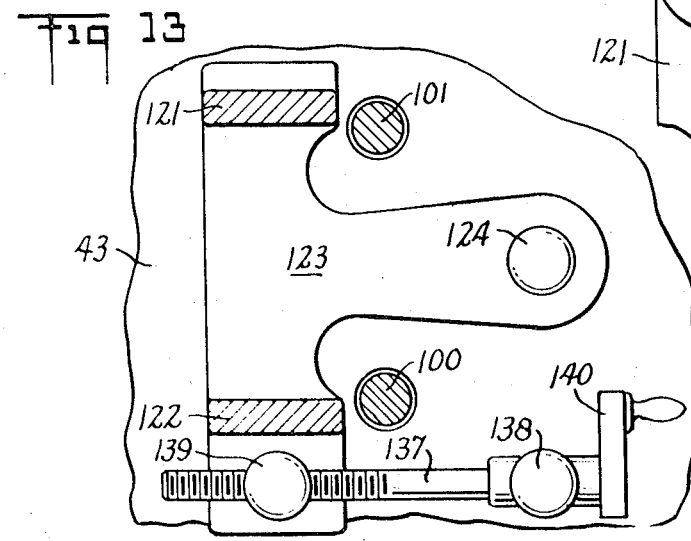

United States Patent Office 3,536,559
Patented Oct. 27, 1970

3,536,559
APPARATUS FOR MAKING HIGHLY CONTRACTILE WIRE-REINFORCED FLEXIBLE HOSE
Richard B. Pelley, East Kingston, N.H., and George E. Herbert, Haverhill, Mass., assignors to Callahan Mining Corporation, New York, N.Y.
Filed July 6, 1967, Ser. No. 651,556
Int. Cl. B31c; B65h 81/00
U.S. Cl. 156—429                      6 Claims

ABSTRACT OF THE DISCLOSURE

Disclosed herein in a wire-reinforced flexible hose having a strong tendency to contract in length to a compact bundle.

The hose is made by first plastically or permanently deforming the hose reinforcing wire so that it begins to assume the shape of a first helix. The wire is not permitted, however, to fully assume the first helical shape but is next elastically deformed or stretched into a second helix opposite in sense to the first helix. The elastically deformed wire is then constrained in that shape by a hose covering of helically wound flexible tape.

Also disclosed is apparatus for forming the hose of the invention by the above method, including first rolls for feeding and plastically deforming the wire; separate hose forming rolls which draw and elastically deform the wire into a helical shape; a forming head which is combination with the hose forming rolls causes the flexible tape to be wrapped about the elastically deformed wire; and a dual clutch arrangement which coordinates the feed of the wire and tape.

BACKGROUND OF THE INVENTION

The present application is directed to improvements in the apparatus described and claimed in U.S. Pat. No. 3,336,172 issued Aug. 15, 1967, entitled Method and Apparatus for Continuously Forming a Reinforced Flexible Hose, and assigned to the assignee of the present application.

Flexible hose of the type disclosed in the above-identified patent is often used in situations requiring relatively long, yet readily portable lengths of hose. As an example, flexible hose is used for the pre-flight air conditioning of commercial airliners whose on-board air conditioners only function during flight. Long lengths of hose are required to reach from the service vehicle on the runway to the airliner cabin. However, the hose must be quickly transportable from one plane to another with minimal danger of hose damage in order to maintain tight airline schedules. Flexible hose which will quickly contract in length to a compact bundle when not in use is ideal for such an application. Prior art hose, however, has been unsatisfactory for this type application because, at best, only weakly contractile properties have been attainable.

In one prior art method for making contractile hose, the wire hose-reinforcing member has been first plastically deformed into a helix having a relatively small pitch, and then stretched or elastically deformed into a helix of the same sense but of greater pitch before being incorporated in the hose structure; in general, the contractile force and thus the ease of contraction of the hose thus formed is directly proportional to the magnitude of the difference between the pitch of the plastically and elastically deformed helixes. The elastically deformed wire is then incorporated into the hose structure in its stretched condition, and its tendency to return to the helix of smaller pitch causes some contraction to take place in the completed hose. It will be noted that hose so formed will contract only to the extent of the pitch of the smaller helix resulting from plastic deformation. In addition, the wire can be elastically deformed by only a limited amount before further plastic deformation occurs, thus the difference in pitch attainable between the plastically and elastically formed helixes is limited. Accordingly, the amount and ease of contraction has been severely limited in hose formed by prior art methods.

SUMMARY OF THE INVENTION

The present invention relates to a highly contractile wire reinforced flexible hose and the method and apparatus for forming such hose. Flexible hose of a type generally similar to the hose of the invention, but without the built in contractable feature, is disclosed in Pats. Nos. 2,486,387 and 2,674,296 to R. G. Bringolf, in Pat. No. 2,759,521 to J. T. Hall et al., and in Pat. No. 3,311,523 to L. E. Carpenter et al., all assigned to the assignee of the present application.

Generally, referring to FIG. 2 and 2A, the highly contractile hose 20 of the invention comprises a hose covering which is preferably a helically wound flexible tape material 21 preconditioned with an adhesive coating. The character of the helical path taken by the tape 21 is such that the lateral edge portions of adjacent tape convolutions assume an overlapping relationship. A reinforcing wire 22 preferably of spring steel is incorporated between the overlapping edges of the helically wound tape 21.

The highly contractile characteristic of the hose of the invention results from the novel manner in which the wire 22 is deformed to the shape of the helix it assumes within the hose construction. As shown diagrammatically in FIG. 2A, wire 22 is first plastically, i.e., permanently, deformed by the apparatus of the invention so that it begins to assume the shape of a first helix which would have the configuration shown in dotted lines. However, the plastically deformed wire 22 is not permitted to follow its normal helical path but is drawn out of that path and elastically deformed or stretched into a second helical path opposite in sense to the first helix. Thus as shown in FIG. 2A for purposes of illustration, the plastically deformed wire 22 would tend to follow a left-hand directed helical path (dotted lines) but it is drawn and elastically deformed into a helical path of opposite sense, i.e., a right-hand directed helical path. It will be understood, however, that the original helical path can be either right-hand or left-hand directed and that the expression "opposite in sense" as used throughout this application in the specification and claims refers to a helix of opposite relative direction.

As further shown in FIG. 2 and 2A, the wire 22 in its elastically deformed helical shape is securely incorporated between the overlapped convolutions of the tape 21. Wire 22 is thus constrained against returning to its plastically deformed, oppositely directed helical path. The very strong tendency of the spring wire 22 to return to an unconstrained shape results in a very high contractile force being built into the finished hose structure 20. It can be seen that the contractile tendency of hose produced in accordance with the invention is considerably higher than that of hose manufactured in the manner described in the prior art.

Although there is herein illustrated only the hose formed by helically winding a tape about the wire specially deformed on the apparatus of the invention, it will be understood that a reinforcing wire, plastically and elastically deformed in accordance with the invention, may be incorporated within or about a hose covering comprising a cylindrical tube of flexible material, and constrained in its elastically deformed condition by stitching, heat shrinking or other manner known in the art. Hose thus formed will also exhibit the highly contractile property exhibited by the hose illustrated in the drawings and constitutes another embodiment of the invention.

Accordingly, representative objects of the present invention are to provide a reinforced flexible hose having a strong tendency to contract in length, and to provide a method and apparatus for the manufacture of such hose.

Other objects of the invention will in part be obvious and will in part appear hereinafter.

The invention accordingly comprises the several steps and the relation of one or more of such steps with respect to each of the others, the apparatus embodying features of construction, combinations and arrangement of parts which are adapted to effect such steps, and the article which possesses the characteristics, properties and relation of elements, all as exemplified in the detailed disclosure hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a perspective view of a hose forming apparatus constructed according to the invention;

FIG. 2 is a fragmentary perspective view of the manner of forming a wire reinforced flexible hose according to the method of, and by the apparatus of, the present invention;

FIG. 2A is a diagrammatic view illustrating the manner in which the wire reinforcement member of the hose of the invention is first plastically and then elastically deformed;

FIG. 3 is a partial sectional view of the apparatus and hose of the invention taken along line 3—3 of FIG. 2;

FIG. 4 is a front elevational view of the flexible hose forming apparatus of FIG. 1;

FIG. 5 is a side elevational view of a portion of the apparatus looking to the right along line 5—5 of FIG. 4;

FIG. 6 is a sectional view of a portion of the apparatus looking to the right along line 6—6 of FIG. 4;

FIG. 7 is an end elevational view of the hose forming apparatus of FIG. 1;

FIG. 8 is an enlarged longitudinal sectional view of a portion of the apparatus looking down along line 8—8 of FIG. 7;

FIG. 9 is an enlarged elevational view looking to the right along line 9—9 of FIG. 7;

FIG. 10 is an enlarged elevational sectional view looking to the right along line 10—10 of FIG. 7;

FIG. 11 is an enlarged plan view of a portion of the apparatus of FIG. 7;

FIG. 12 is a sectional view looking up along line 12—12 of FIG. 11; and

FIG. 13 is a longitudinal sectional view of a portion of the apparatus looking down along line 13—13 of FIG. 7.

Similar reference characters refer to similar parts throughout the several views of the drawings.

DESCRIPTION OF THE PREFERRED EMBODIMENTS

Referring now to the drawings and particularly to FIGS. 2 and 3, the hose of the invention, generally indicated at 20, is formed from a helically wound flexible tape material 21, preferably preconditioned with an adhesive coating. The character of the helical path taken by the tape 21 is such that the lateral edge portions of adjacent tape convolutions assume an overlapping relationship. A wire 22 of spring steel, plastically and elastically deformed into a helix 23 in the manner described hereinabove is incorporated between the overlapping edges of the helically wound tape 21. The overlapping edge portions are bonded together with the wire 22 lodged therebetween to provide a seam, generally indicated at 24 in FIG. 3, spiralling the entire length of the hose 20. Preferably, a wear strip 27 of abrasion resistant material is overlayed on the seam 24 to guard against seam damage when the hose 20 is allowed to contract while resting on an abrasive surface. The resulting elongated tubular structure provides a hose 20 which is highly contractile in the axial direction, flexible in the lateral direction, and yet quite rigid in the radial drection due to the reinforcement wire 22 incorporated in the continuous seam 24.

In the continuous forming of the hose 20 described above by the method and apparatus of the invention, the reinforcing wire 22 is drawn from a supply roll (not shown) by two sets of driven rollers, generally indicated at 25 in FIG. 2. The reinforcing wire 22 exiting from the bite of the rollers 25 is pushed against an idler roller 26. This idler roller 26 is adjustably positioned above the bite of the rollers 25. The section of reinforcing wire 22 between the bite of the rollers 25 and the point of contact with the idler roller 26 is plastically deformed to assume an arcuate path having a radius of curvature dependent upon the positioning of the idler roller 26 relative to the rollers 25.

The reinforcing wire 22 passes from the idler roller 26 into contact with an elevated idler roller 28 adjustably positioned above the idler roller 26 and in back of the vertical plane containing the idler roller 26 and the rollers 25 as viewed in FIG. 2. The reinforcing wire 22, on encountering the elevated idler roller 28 is deflected out of its arcuate path and into a first helical path directed away from the rollers 25. The section of wire 22 between the elevated idler roller 28 and the bite of the rollers 25 is twisted to the extent that it is plastically deformed to the shape of a left-hand directed helix as viewed in FIG. 2.

The reinforcing wire 22 is thus continuously plastically deformed from a straight wire and begins to assume the shape of a wire helix on leaving the bite of the rollers 25, with the relative position of the idler roller 26 determining the radius and the relative position of the elevated idler roller 28 determining the pitch of the resulting wire helix.

The plastically deformed wire 22, however, is not permitted to continue along the helical path imposed by roller 28. The leading end of the plastically deformed wire 22 is pulled back under the straight portion thereof feeding into rollers 25 as shown in FIG. 2, and fed into the nip of a pair of hose forming rolls 29 and 30 (FIG. 1). Rolls 29 and 30 are driven rolls and thus act to continuously draw and elastically deform wire 22 into a second, right-hand directed helical path 23. The wire 22 as thus deformed contains a considerable internal stress tending to snap it back to its permanent or plastically deformed helical shape, and as will be understood in light of the following discussion, it is this internal stress in wire 22 which contributes the highly contractile quality to the hose of the invention.

Still referring to FIG. 2, the flexible tape 21 is drawn from a tape supply (not shown) by the hose forming rolls 29 and 30. The free end of the tape 21 is introduced into the nip of the upper forming roll 29 and the lower larger forming roll 30. The tape 21 leaving the nip of the hose forming rolls 29 and 30 is looped over a hose forming head, generally indicated at 31, and the tape end re-fed into the nip of the hose forming rolls. The hose forming head 31 includes a plurality of supporting rollers 32, mounted in circumferentially spaced relationship as best seen in FIG. 1, to support this tape loop and thereby control the diameter of the finished hose in the manner taught in the above-noted Hall et al. Pat. No. 2,759,521.

The hose forming head 31 further includes a biasing roller generally indicated at 34 which bears against the wire 22 within the overlapped edges of strip 21 as shown in FIGS. 2 and 3. Biasing roller 34 prevents contraction of hose 20 on forming head 31 and serves to steer the tape loop into a helical path so that when the end of the tape 21 is re-fed into the nip of the hose forming rolls 29 and 30 an edge overlapping relationship is achieved. Just prior to the achievement of this edge overlapping relationship, the end of the wire helix 23 is introduced into the nip of the forming rolls 29 and 30 between the overlapping edges of the tape 21. The pressure of the forming rolls 29 and 30 bonds the overlapping edges of the tape 21 together with the wire 22 incorporated therebetween to create the continuous seam 24 shown in FIG. 3.

Referring to FIGS. 1 and 9, the rollers 25 consist of a pair of upper rollers 36 and 37 mounted for rotation with drive shafts 36a and 37a, respectively, journalled in an upper bearing casing 38. A pair of lower rollers 39 and 40 are keyed to drive shafts 39a and 40a, respectively, journalled in a lower bearing casing 41. The lower bearing casing 41 is mounted on an upright bracket 42 affixed to a table 43.

As more clearly seen in FIG. 9, the upper bearing casing 38 and lower bearing casing 41 are spring loaded so as to urge upper roller 36 toward lower roller 39 and upper roller 37 toward lower roller 40. To achieve this end, a pair of legs 44 and 44' are affixed in the lower bearing casing 41 and slidably received through bores in the upper bearing casing 38. A shaft 45 passing vertically through a bore in the upper bearing casing is threaded into the lower bearing casing 41 by turning a crank 46 affixed to its upper end. A spring 47 slipped on the shaft 45 is compressed between the crank 46 and the top of the upper bearing casing 38 so as to urge the latter downwardly toward the lower bearing casing 41. This downward biasing is resisted by a pair of springs 48 and 48' compressed between the upper and lower bearing casings 38, 41.

The rollers 36 and 39 are counter-rotated, as are rollers 37 and 40, by driving means to be described, to draw the reinforcing wire 22 from a supply roll. The wire 22 passing between each upper and lower roller set is lodged in grooves 49 (FIG. 1) formed in the surface of each roller to maintain the wire centered between the rollers and to increase the surface contact between the wire and the roller surfaces. The rollers 25 thus acquire a sure bite on the wire 22 so as to steadily draw the wire from the supply roll. To initially feed the wire 22 between these rollers, the crank 46 is turned to release the downward pressure of spring 47. Once the end of the wire 22 is fed between the rollers 25, the crank 45 is turned to compress the spring 46 until the desired bite on the wire 22 is achieved. By virtue of the spring loading of the rollers 25, jamming caused by surface irregularities and kinks in the wire 22 is largely eliminated.

Still referring to FIG. 9, the idler roller 26, having an annular groove 51 (FIG. 1) to center the wire 22, is rotatably mounted on a bracket 52. One end of the bracket 52 is journalled about the drive shaft 37a for roller 37 to pivot freely about the axis thereof. The other end of the bracket 52 is pivotally linked to a sleeve 53. The sleeve 53 is slipped on a rod 54 having a series of uniformly spaced annular grooves 55. A pin 56 inserted through the sleeve 53 locks the sleeve on the rod 54 relative to one of the grooves 55. The lower end of the rod 54 is threaded through a post 58 pivotally mounted by a bracket 59 affixed to the table 43. The rod 55, when rotated by a hand crank 60, turns freely in the sleeve 53 and advances into or out of post 58.

It will thus be seen that the pin 56 can be withdrawn and the upper end of the bracket 52 raised or lowered to produce the desired positioning of the roller 26. The sleeve 53 slides on the rod 54 to the one groove 55 which comes closest to giving the desired elevation of roller 26. Pin 56 is reinserted to lock the sleeve 53 on the rod 54 relative to the selected groove 55. The rod 55 is turned by the crank 60 for a fine adjustment of the positioning of idler roller 26. As previously described, the position of the idler roller 26 determines the diameter of the plastically deformed wire helix.

Returning to FIG. 1, the elevated idler roller 28 is mounted for rotation about a vertical axis by a bracket 62. The bracket 62 is affixed to the free end of an arm 63 slidably held in a sleeve 64. The sleeve 64 is held on the upper end of a standard 65 slidably and rotatably mounted in a bracket 66 (FIG. 4) affixed to the upper bearing casing 38. Elevation and azimuth positioning of the idler roller 28 is obtained by sliding and rotating the standard 65 in the bracket 66 and then locking it in position by suitable means, not shown. The length of the arm 63 may be adjusted by sliding it through the sleeve 64 to finally position the idler roller 28 relative to the rollers 25 and thereby determine the pitch of the plastically deformed wire helix as previously described. It will thus be seen that the idler rollers 26 and 28 are readily positionable to produce a plastically deformed wire helix having the desired dimensional characteristics.

The reinforcing wire 22, in contacting the idler roller 28, passes between the forked ends 68, 68' of a switch operating member 69 (FIGS. 1 and 4) pivoted to a block 70 affixed to the arm 63. The member 69 pivots in response to variations in the diameter of the wire helix 23 to selectively operate a microswitch 71 also mounted on the block 70. The microswitch selectively controls the drive in a manner to be described so as to coordinate the speeds of the rollers 25 and the forming rolls 29 and 30.

Referring now to FIG. 4, the tape 21, drawn from a supply roll (not shown), is suitably conditioned by the application of an adhesive coating to both sides of the tape. The tape 21 is fed through a tracking mechanism, generally indicated at 73. The tracking mechanism 73 consists of a pair of spaced upper rollers 74 and 75 mounted above the table 43 and a pair of lower rollers 76 and 77 mounted beneath the table. The upper and lower rollers 75, 77 may be laterally offset from upper and lower rollers 74, 76 so as to provide any lateral adjustment necessary to compensate for misalignment of the point of tape output from the supply and the point of tape input to the hose forming apparatus.

The tape 21, after passing over the upper roller 75, is wrapped around an idler roller 79 and over a tension drum 80. The idler roller 79 and the tension drum 80 are rotatively mounted by a bracket 81 affixed to the table 43. As seen in FIG. 5, a brake shoe 82, mounted on the end of a shaft 83 threaded through the side of the bracket 81, bears against the end of the tension drum 80. A fixed brake shoe 82' bears against the opposite end of the drum 80. A wing head 84 formed on the free end of the shaft 83 facilitates turning of the shaft to adjust the brake pressure against the drum 80. With the rotation of the drum 80 resisted by the action of the brake shoe 82, 82', the desired tensioning of the tape 21 is achieved as it is drawn by the hose forming rolls 29 and 30.

A tape guide, generally indicated at 86 in FIGS. 4 and 6, serves to properly guide the tape 21 into the nip of the hose forming rolls 29 and 30. The tape guide is formed by a channel 87, best seen in FIG. 6, mounted by a bracket 88 affixed to the table 43.

When used in the hose construction, wear strip 27 is also drawn through tape guide 86 (FIG. 4) and thus directed into the nip of the hose forming rolls 29 and 30 where it is overlayed on the hose seam 24 (FIG. 2).

Returning again to FIG. 1, the lower hose forming roll 30 is formed with a circular groove 90 and is recessed on each side of the groove to receive annular rubber inserts 91 and 92 which extend slightly beyond the surface of the roll. The upper forming roll 29 is also formed with a circular groove 93 vertically aligned with the groove 90 in the lower forming roll 30. With the upper and lower forming rolls 29, 30 urged toward peripheral contact, the wire 22 is accommodated in the grooves 90 and 93 while the rubber inserts 91, 92 deform to provide greater roll surface contact at the nip for firmly bonding the overlapping edges of the tape 21 together in forming the hose 20.

As shown in FIG. 7, the lower forming roll 30 is keyed to a drive shaft 95 journalled in spaced bearing housings 96 and 97 mounted on the table 43. The upper forming roll 29 is keyed to a second drive shaft 98 rotatably mounted at a point inwardly of the roll by a movable bearing housing 99. The inner end of the drive shaft 98 is mounted in the bearing housing 97. The outer end of the shaft 98 is unsupported in order that the hose 20 may feed axially outward from the nip of the upper and lower forming rolls 29, 30 as seen in FIG. 2.

The movable bearing housing 99 rotatably mounting the drive shaft 98, as more clearly seen in FIG. 10, is supported on the upper ends of a pair of spaced legs 100 and 101. The lower ends of the legs 100 and 101 pass through the table 43 and through bores in a mounting block 102 bolted beneath the table. A common bridging member 103 is affixed to the lower ends of the legs 100 and 101 which project through the mounting block 102. A pair of stud bolts 104 and 105 passing freely through bores in the bridging member 103 are threaded into the mounting block 102. The lower ends of the spaced stud bolts 104 and 105 receive springs 106, 106' which are compressed by nuts 107, 107' threaded on the ends of the stud bolts. Compression of the springs 106 and 106' urges the bridging member 103 together with the legs 100 and 101 upwardly. This movement is prevented by an eccentric 108 keyed to a shaft 109 mounted beneath the table 43.

As seen in FIGS. 4 and 7, the end of the shaft 109 is keyed to a crank 110 which is manipulated to rotate the ecentric 108 thereby permitting the springs 106, 106' to urge the bearing housing 99 upward. This rocks the shaft 98 slightly upwardly to lift the upper forming roll 29 away from the lower forming roll 30. While the forming rolls 29 and 30 are separated the end of the tape 21 is readily introduced between the forming rolls, looped over the forming head 31 and re-fed along with the end of the elastically deformed wire helix 23 between the hose forming rolls. Once this is accomplished, the crank 110 is turned to rotate the eccentric 108 forcing the bearing housing 99 downward and moving the upper forming roll 29 toward the lower forming roll 30. Once this is accomplished, the apparatus is prepared to begin forming the hose 20.

Referring again to FIG. 1, the rollers 32, supporting the tape 21 as it is looped back and re-fed into the nip of forming rolls 29 and 30, are cantilever mounted in circumferentially spaced relationship by a face plate 112. The face plate 112 is removably affixed to a flanged block 114 by bolts 115, as best seen in FIG. 11. Spacing sleeves 116, serve to space the face plate 112 from the flanged block 114. The flanged block 114 is slidably received in a channel 118. A pair of arms 119, 119', affixed to the channel 118, pivot with the rotation of a horizontal shaft 120. The shaft 120 is rotatably mounted by a pair of standards 121, 122 affixed to a base plate 123 lying on the upper surface of the table 43 and pivoting about a pin 124, as seen in FIGS. 1 and 13.

Referring now to FIG. 12, an upper ear 126 affixed to the top of the channel 118 is vertically aligned with lower ear 127 affixed to the flanged block 114. A shaft 128 collared to the upper ear 126 is threaded through the lower ear 127. Rotation of the shaft 128 slidably positions and holds the flanged block 114 in the channel 118 to provide a fine vertical position adjustment of the forming head 31 relative to the nip of the forming rolls 29 and 30.

Referring again to FIG. 1, a crank arm 130 is keyed to the horizontal shaft 120. A shaft 131 rotatably mounted by a collar 132 attached to the standard 122 is threaded through a post (not shown) pivoted at 134 to the lower end of the crank arm 130. A hand crank 135 affixed to the end of the shaft 131 is rotated to pivot the crank arm 130 which, in turn, rotates the shaft 120. It will thus be seen that the forming head 31 swings vertically to adjustably position it relative to the nip of the hose forming rolls 29, 30.

A second shaft 137 is rotatably mounted in a post 138 pivotally mounted to the table 43. The thread end of the shaft 137 is threaded through a post 139 pivotally mounted to the base plate 123. The other end of the shaft 137 receives a crank 140 used to turn the shaft so as to pivot the base plate 123 about the pin 124. This, in turn, swings the forming head 31 horizontally into the desired position.

It will thus be seen that the hose forming head 31 is readily pivotable about the horizontal axis of the shaft 120 and the vertical axis of the pin 124 so as to substantially properly orient the rollers 32 and the biasing roller 34 relative to the hose forming rolls 29, 30 for the desired pitch of the helically wound hose 10. Turning of the shaft 128 then provides a fine position adjustment of the hose forming head 31. The hose forming head 31 can be readily unbolted from the flanged block 114 and replaced with another hose forming head when it is desired to make hose of a different diameter.

As shown in FIGS. 2 and 3, biasing roller 34 comprises a wheel 142 having a conical rim 144 and rotatably mounted to an arm 146 by a pin 145. Arm 146 is mounted between the legs 147a, 147b at one end of a doubly bifurcated yoke 148 by means of a cap screw 150. The opposite end of yoke 148 is pivotally mounted to a bracket 152 by a cap screw 154 passing through a washer 156 bridging the legs 157a, 157b at that end. Thus, by loosening cap screws 150 and 154, the position of wheel 142 relative to the seam 24 of hose 20 can be adjusted as desired.

As seen in FIG. 3, the conical rim 144 of wheel 142 should bear against the edge of seam 24 facing forming head 30 to prevent contraction of the hose 20 onto forming head 30. It can be seen that such contraction would disrupt the hose forming process if permitted to occur. Wheel 142 should also be positioned, as shown in FIG. 2, so that it indexes tape 21 as it loops over forming head 31 to overlap the adjacent edges thereof about the elastically deformed reinforcing wire 22 between rolls 29 and 30. Bracket 152 (FIG. 2) is mounted to face plate 112, and for very precise positioning of wheel 142, bracket 152 may be made adjustable along the axis of forming head 31.

As seen in FIG. 7, a motor 158, suitably mounted beneath the table 43, is coupled to an output shaft 160 through a suitable reduction unit 162. Referring now to FIG. 8, a pair of drive sprockets 164 and 166 are keyed to the output shaft 160. The sprocket 164 drives a chain 168 which runs upwardly, as best seen in FIG. 4, to where it engages a sprocket 170 (FIG. 7) keyed to a first jack shaft 172. The jack shaft 172 is journalled at its ends in a pair of bearings 174 and 176 mounted beneath the table 43. A sprocket 178 keyed to the jack shaft 172 drives a second chain 180 which is brought up through the top of the table 43 to engage a sprocket 182 (FIGS. 1 and 7) keyed to the shaft 95 of the lower forming roll 30. A pinion 184 keyed to the shaft 95 engages a second smaller pinion 186 keyed to the end of the shaft 98 of the upper forming roller 29. In this manner, the forming rolls 29 and 30 are driven in counter-rotating fashion to draw the tape 21 and the elastically deformed wire 22 through their nip in forming the hose 20 as previously described.

Still referring to FIG. 8, the second drive sprocket 166 drives a chain 188 which runs upwardly (FIG. 4) to where it engages a sprocket 190 keyed to a second jack shaft 192. Jack shaft 192 is rotatably mounted beneath the table 43 in spaced bearings 194 and 196. A sprocket 198 keyed to the jack shaft 192, engages a chain 200 to drive a sprocket 202 which is coupled through a magnetic clutch 204 to a shaft 206. Shaft 206 is journalled in spaced bearings 208 and 210 mounted beneath table 43. Another sprocket 212 keyed to the jack shaft 192 engages a chain 214 to drive a sprocket 216 coupled to the shaft 206 through an over-riding clutch 218. The over-riding clutch 218 may be of the type manufactured by the Formsprag Company of Warren, Mich., or any equivalent device.

A sprocket 220 keyed to the shaft 206 engages a chain 222 which is brought up through the table 43 to drive a sprocket 224 as seen in FIG. 1. Sprocket 224 is keyed to the shaft 39a journalled in an upright bearing housing 226 for driving the roller 39. A pinion 228 keyed to shaft 39a engages a pinion 230 keyed to the shaft 36a of the roller 36 to counter-rotate rollers 36 and 39. A sprocket 232 keyed to the end of the shaft 36a engages a chain 234 to drive a sprocket 236 (FIG. 7) keyed to the shaft 37a of the upper roller 37. As best seen in FIG. 7, the shaft 37a mounts a pinion 238 which drives a pinion 240 keyed to the shaft 40a of the lower roller 40. In this manner, the rollers 37 and 40 are also driven in counter-rotational fashion.

The drives for the hose forming rolls 29, 30 and the wire deforming rollers 25 (FIGS. 1 and 2) must be coordinated so that the rate at which the wire helix 23 is fed to the forming rolls substantially equals the rate of formation of the hose 20. It is found to be particularly troublesome to achieve a predetermined relationship between the two drives because of the stretchable characteristics of the tape 21 and the unstretchable characteristics of the wire 22. In order to achieve continued coordination of the two drives, the sprockets 212 and 216, as seen in FIG. 8, are chosen so as to drive the rollers 25, feeding the wire 22, through the over-riding clutch 218 at a rate which is less than the rate at which the hose forming rollers 29, 30 are driven. For example, the rollers 25 may be driven through the over-riding clutch 218 at a rate 5% less than the driving rate of the hose forming rolls 29, 30. Sprockets 198 and 202, on the other hand, are chosen so as to drive the rollers 25 through the magnetic clutch 204 at a greater rate, such as 5% greater, than the constant driving rate of the hose forming rolls 29, 30. The choice of whether to drive the rollers 25 through the over-riding clutch 218 or the magnetic clutch 204 is made by the microswitch 71 shown in FIG. 1.

As will be seen from FIG. 2, if the rollers 25 are being driven through the over-riding clutch 218, the hose forming rolls 29, 30 will be using up the wire 22 at a faster rate than it is being supplied by the rollers 25. As a consequence the wire helix 23 between the rollers 25 and the hose forming rolls 29, 30 will be extended thereby causing a decrease in the helix diameter of the portion of wire 22 adjacent idler roller 28. This reduction in helix diameter is sensed by the switch operating member 69 which is pivoted downwardly by the wire 22 passing between its forked ends 68, 68'. This downward pivoting of the switch operating member 69 closes the microswitch 71 to energize the magnetic clutch 204. The magnetic clutch 204 engages to connect the drive of the sprockets 198 and 202 to the rollers 25. With the shaft 206 now being driven at a 10% faster rate, the clutch 218 is over-ridden thereby disengaging the drive sprocket 216 from the shaft 206. Since the wire 22 is now being supplied at a faster rate than it is being used up by the forming rolls 29, 30, the wire helix 23 will be effectively compressed. The resulting increase in the helix diameter will pivot the switch operating member 69 upwardly to eventually open the microswitch 71 and de-energize the magnetic clutch 204. With the sprocket 202 now disengaged, the over-riding clutch 218 will engage the sprocket 216 to the shaft 206, when the shaft rotational velocity slows to that of the sprocket 216.

It will thus be seen that the drive of the rollers 25 alternates through the over-riding clutch 218 and the magnetic clutch 204 to continuously maintain the feed rate of the wire 22 to the hose forming rolls 29, 30 between satisfactory limits.

The flexible hose constructed according to the present invention is found to be highly contractile, of high durability and ruggedness, and fluid tight. Since the wire 22 is not incorporated in a folded back edge of the tape 21, as in some prior art hose constructions, a saving in tape is obtained. Moreover, greater lap strength is achieved since the tape edges are overlapped and bonded together on both sides of the wire 22 and preferably a wear strip 27 is used over the seam 24. As a result, the seam 24 is less likely to separate on being subjected to sharp blows or abrasion at points adjacent the wire 22. Furthermore, since the reinforcing wire 22 is incorporated between tape edges which are simply overlapped, a substantially smoother inner hose surface is obtained, thus offering little resistance to the passage of gases through the hose. It is also found that the reinforcing wire 22 can be severed at a point close to the end of the hose 20 and the loose end of the wire readily pulled out without destroying the seam 24. This leaves an unreinforced hose end portion to which a cuff or coupling can be more readily attached.

By the method and apparatus of the present invention, the flexible hose 20, having the above-noted characteristics, can be formed in "continuous wind" fashion at production line speeds. The hose forming apparatus is readily adapted to forming hose of different diameters by the simple substitution of the appropriate hose forming head 31 having rollers 32 circumferentially arranged according to the desired hose diameter. The forming head 31 is readily oriented to position the tape guide 34 so as to give the desired pitch to the helically wound tape 21. Since the hose forming rolls 29, 30 are provided with single coacting grooves 90, 93, they do not have to be changed when the pitch of the helically wound tape is changed.

The highly contractile property of the hose of the invention, which is contributed by the strong tendency of the elastically deformed reinforcing wire in the hose to return to its plastically deformed oppositely directed helical shape, makes the hose extremely portable. Long lengths can be readily transported in a compact collapsed condition. Further, the contractile force tends to keep the hose relatively taut when connected between spaced points, and thus greatly lessens the chances of snagging or entanglement and resultant hose damage.

It will thus be seen that the objects set forth above, among those made apparent from the preceding description, are efficiently attained and, since certain changes may be made in carrying out the above process, in the described product, and in the constructions set forth without departing from the scope of the invention, it is intended that all matter contained in the above description and shown in the accompanying drawings shall be interpreted as illustrative and not in a limiting sense.

Having described our invention, what we claim as new and desire to secure by Letters Patent is:

1. An apparatus for continuously forming a highly contractile reinforced flexible hose from a continuous flexible tape and a continuous spring wire, said apparatus comprising, in combination:

(A) deforming means for continuously plastically deforming said wire into a first either right-hand or left-hand directed helical path,
    (1) said deformation means having an area adapted to contact and deflect said wire into first helical path; and (B) means positioned substantially on the opposite side of said deforming means from said area
    (1) for continuously drawing and elastically deforming said wire into a second helical path which is directed to the opposite hand relative to said first helical path, and
    (2) for incorporating and securing said elastically deformed wire between overlapping edges of said tape to form said reinforced flexible hose.

2. An apparatus for continuously forming a highly contractile reinforced flexible hose from a continuous flexible tape and a continuous spring wire, said apparatus comprising, in combination:
(A) deforming means for continuously plastically deforming said wire into a first either right-hand or left-hand directed helical path,
  (1) said deforming means having an area adapted to contact and deflect said wire into said helical path;
(B) hose forming roll means positioned substantially on the opposite side of said deforming means from said area, and
  (1) continuously drawing and elastically deforming said wire into a second helical path which is directed to the opposite hand relative to said first helical path; and
(C) forming head means adjacent to and cooperating with said forming roll means
  (1) to move said flexible tape over a helical path of the same relative direction as said second helical path, and
  (2) to overlap adjacent lateral edges of said tape about said elastically deformed wire, whereby said wire is constrained within said flexible hose structure in its elastically deformed condition.

3. An apparatus as defined in claim 2 and further including:
(D) first drive means for driving said hose forming roll means at a substantially constant speed;
(E) second drive means for feeding said wire through said deforming means, said second drive means
  (1) acting through a first clutch means to feed said wire at a speed slightly less than the speed of said hose forming roll means, and
  (2) acting through a second clutch means to feed said wire at a speed slightly in excess of the speed of said hose forming roll means; and
(F) sensing means responsive to variations in the helical configuration of said wire to cause said second drive means to selectively act through said first and second clutch means to substantially coordinate the speed of said second drive means to the speed of said hose forming roll means.

4. An apparatus as defined in claim 2 wherein said deforming means comprises, in combination, a coacting pair of rollers for drawing said wire from a supply, plastic deformation means mounted relative to said rollers to plastically deform said wire into an arcuate path, and a deflection member mounted laterally of said arcuate path and having said area thereon in a position to engage said wire and plastically deform it out of said arcuate path into said first helical path.

5. An apparatus as defined in claim 2 wherein said forming head means includes biasing means positioned to bear against the wire within said overlapped edges of said tape to bias it in the direction of said second helical path and prevent contraction of said hose on said forming head means.

6. An apparatus for continuously forming a highly contractile reinforced flexible hose from a continuous flexible tape and a continuous spring wire, said apparatus comprising, in combination:
(A) means for continuously plastically deforming said wire into a first either right-hand or left-hand directed helical path, said means including
  (1) a coacting pair of spring loaded rollers drawing said wire along a substantially straight line path from a supply,
  (2) deformation means adjustably mounted relative to said rollers to plastically deform said wire into an arcuate path, and
  (3) a deflection member adjustably mounted laterally of said arcuate path with an area thereof in position to engage said wire to plastically deform it out of said arcuate path into said first helical path;
(B) a pair of coacting hose forming rolls positioned substantially on the opposite side of said deflection member from said area
  (1) for continuously drawing and elastically deforming said wire into a second helical path which is directed to the opposite hand relative to said first helical path, and
  (2) for continuously drawing said tape from a supply;
(C) a forming head positioned adjacent said forming rolls comprising
  (1) a plurality of supporting rollers cantilever mounted in circumferentially spaced relationship corresponding substantially to the diameter of said second helical path,
    (a) said supporting rollers cooperating with said forming rolls to move said flexible tape over a helical path of the same relative direction as said second helical path and to overlap and secure adjacent lateral edges of said tape about said elastically deformed wire, and
  (2) a biasing member
    (a) in position to bear against and bias the wire within said overlapped edges of said tape in the direction of said second helical path to prevent contraction of said hose on said forming head.

References Cited

UNITED STATES PATENTS

| | | | |
|---|---|---|---|
| 2,731,070 | 1/1956 | Meissner | 156—143 |
| 3,311,523 | 3/1967 | Carpenter et al. | 156—429 |
| 3,336,172 | 8/1967 | Hall et al. | 156—429 |

SAMUEL FEINBERG, Primary Examiner

U.S. Cl. X.R.

156—431